US008644682B2

(12) United States Patent
Eklund et al.

(10) Patent No.: US 8,644,682 B2
(45) Date of Patent: Feb. 4, 2014

(54) PLAYABLE CONTENT

(75) Inventors: Don Eklund, Yorba Linda, CA (US); Sumit Malik, Pasadena, CA (US); Raja Sahi, Los Angeles, CA (US); Tommy Choy, Lakewood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1268 days.

(21) Appl. No.: 11/467,887

(22) Filed: Aug. 28, 2006

(65) Prior Publication Data

US 2007/0047923 A1 Mar. 1, 2007

Related U.S. Application Data

(60) Provisional application No. 60/712,664, filed on Aug. 29, 2005, provisional application No. 60/712,684, filed on Aug. 29, 2005.

(51) Int. Cl.
*G11B 27/00* (2006.01)

(52) U.S. Cl.
USPC .......................................... 386/278

(58) Field of Classification Search
USPC .......................................... 386/125
See application file for complete search history.

(56) References Cited

U.S. PATENT DOCUMENTS

| | | | |
|---|---|---|---|
| 3,088,996 A | 5/1963 | Carter | |
| 6,404,711 B1 | 6/2002 | Kato | |
| 6,453,459 B1 | 9/2002 | Brodersen et al. | |
| 6,807,363 B1 | 10/2004 | Abiko et al. | |
| 8,352,977 B2 | 1/2013 | Kato | |
| 2002/0112226 A1 | 8/2002 | Brodersen et al. | |
| 2002/0174438 A1 | 11/2002 | Cleary et al. | |
| 2003/0193520 A1 | 10/2003 | Oetzel | |
| 2003/0228134 A1* | 12/2003 | Kim et al. | ........................ 386/52 |
| 2004/0167916 A1 | 8/2004 | Basso et al. | |
| 2004/0210896 A1 | 10/2004 | Chou et al. | |
| 2004/0220791 A1 | 11/2004 | Lamkin et al. | |
| 2004/0240360 A1 | 12/2004 | Kim et al. | |
| 2005/0013593 A1 | 1/2005 | Jung et al. | |
| 2005/0094972 A1 | 5/2005 | Green | |
| 2005/0114909 A1 | 5/2005 | Mercier | |
| 2005/0155058 A1 | 7/2005 | Jung et al. | |

(Continued)

FOREIGN PATENT DOCUMENTS

| | | | |
|---|---|---|---|
| JP | H10-164478 A | 6/1998 | |
| JP | 11-155131 | 6/1999 | |

(Continued)

OTHER PUBLICATIONS

International Search Report/Written Opinion issued in PCT/US06/26058 on Jun. 27, 2008.

(Continued)

*Primary Examiner* — William C Vaughn, Jr.
*Assistant Examiner* — Daniel Tekle
(74) *Attorney, Agent, or Firm* — Procopio, Cory, Hargreaves & Savitch LLP

(57) ABSTRACT

Authoring a Blu-ray disc (BD), the method comprising: creating playable content structures; linking elementary stream data to the playable content structures; merging the elementary stream data into packetized elementary streams; and generating BD-ROM structures representing playable entities, wherein the playable entities provide information describing the packetized elementary streams and navigation scenarios of the BD.

19 Claims, 14 Drawing Sheets

(56) References Cited

U.S. PATENT DOCUMENTS

2005/0185929 A1    8/2005   Kang et al.
2005/0264437 A1*  12/2005   Uesaka et al. ............... 341/106
2006/0165388 A1    7/2006   Uesaka et al.

FOREIGN PATENT DOCUMENTS

| JP | 3045087 | 5/2000 |
| --- | --- | --- |
| JP | 2003-230104 | 8/2003 |
| JP | 2005-204315 A | 7/2005 |
| WO | 99/38098 | 7/1999 |
| WO | 03/088248 | 10/2003 |
| WO | 2005/002232 | 1/2005 |

OTHER PUBLICATIONS

International Search Report/ Written Opinion issued in PCT/US06/34191 on Jul. 14, 2008.
International Search Report/ Written Opinion issued in PCT/US06/34190 on Jul. 8, 2008.
International Search Report and Written Opinion issued in PCT/US2006/34316 on Aug. 2, 2007.
International Search Report and Written Opinion issued in PCT/US06/34309 on Apr. 9, 2007.
International Search Report and Written Opinion issued in PCT/US2006/34306 on Aug. 29, 2007.
International Search Report and Written Opinion issued in PCT/US06/34307 on Oct. 18, 2007.
Supplementary European Search Report issued in related European Patent Application No. 06790105.8, on Jun. 10, 2010, 11 pages.
Blu-Ray Disc: "White paper Blu-ray Disc Format 2.B Audio Visual Application Format Specifications for BD-ROM", internet citation, Mar. 31, 2005, XP-007903517, http://www.blu-raydisc/com/assets/downloadablefile/2b_bdrom_audiovisualapplication_0305-12955-13403.pdf, retrieved on Nov. 16, 2007, 35 pages.
"Application Definition Blu-ray Disc Format BD-J Baseline Application and Logical Model Definition for BD-ROM", internet citation, Mar. 1, 2005, pp. 1-45, XP007904998, http://www.blurayjukebox.com/pdfs/bdj_gem_application_definition_0503 07-13404>, 45 pages.

* cited by examiner

PLAYABLE CONTENT

RELATED APPLICATION

This application claims the benefit of priority of co-pending U.S. Provisional Patent Application Ser. No. 60/712,664, entitled "Disc Authoring" and co-pending U.S. Provisional Patent Application Ser. No. 60/712,684, entitled "Abstractions in Disc Authoring", both filed Aug. 29, 2005. This application is also related to U.S. patent application Ser. No. 11/467,896, entitled "Abstractions in Disc Authoring", filed on the same day as this application. The disclosures of the above-referenced patent applications are hereby incorporated by reference.

BACKGROUND

The present invention relates generally to disc authoring and, more particularly, to providing abstractions such as Playable Content in authoring optical disks such as Blu-ray Discs.

A media authoring system is typically used to generate articles of media that are compliant with a particular standard. For example, a Digital Versatile Disc (DVD) authoring system is used to generate data, such as audio and video data and information used to present and access the audio and video data, on a DVE. The data on the disc is stored according to standards defined for DVD. Similarly, a Blu-ray Disc (BD) authoring system is used to create optical discs storing information according to the standards defined for BD.

SUMMARY

Implementations of the present invention include systems and methods to implement techniques for disc authoring using abstractions, such as in authoring optical discs compliant with Blu-ray Disc.

In one implementation, a method for authoring a Blu-ray disc (BD) comprises: creating playable content structures; linking elementary stream data to the playable content structures; merging the elementary stream data into packetized elementary streams; and generating BD-ROM structures representing playable entities, wherein the playable entities provide information describing the packetized elementary streams and navigation scenarios of the BD.

In another implementation, a Blu-ray disc (BD) authoring method comprising: receiving elementary stream data; merging the elementary stream data into packetized stream data; and generating BD-ROM specification structures representing playable contents, the playable contents configured to provide varying levels of details for varying levels of users, wherein the playable contents provide information describing the packetized stream data and also provide information regarding navigation scenarios of the BD.

In another implementation, A Blu-ray disc authoring system comprises: A playable content engine configured to generate BD-ROM structures representing playable contents; and a multiplexer configured to receive and multiplex elementary stream data into packetized elementary stream data.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by studying the accompanying drawings, in which like reference numerals refer to like parts, and in which.

DETAILED DESCRIPTION

As will be further described below, embodiments of the present invention provide the need for an efficient structure and configuration in authoring articles of media that are compliant with a particular standard. In one implementation, a Blu-ray Disc (BD) authoring system executes instructions to store information based on the BD standard specifications using abstractions. One such abstraction is Playable Content, which allows Movie Object, PlayList and Clip data to be authored as a unified structure.

After reading this description it will become apparent to one skilled in the art how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention as set forth in the appended claims.

The BD Read Only Memory (BD-ROM) specification provides a number of data structures that needs to be defined on a BD in order for the disc to behave as desired. The BD-ROM specification defines BD Prerecorded and BD Recordable application formats.

Figure 1:
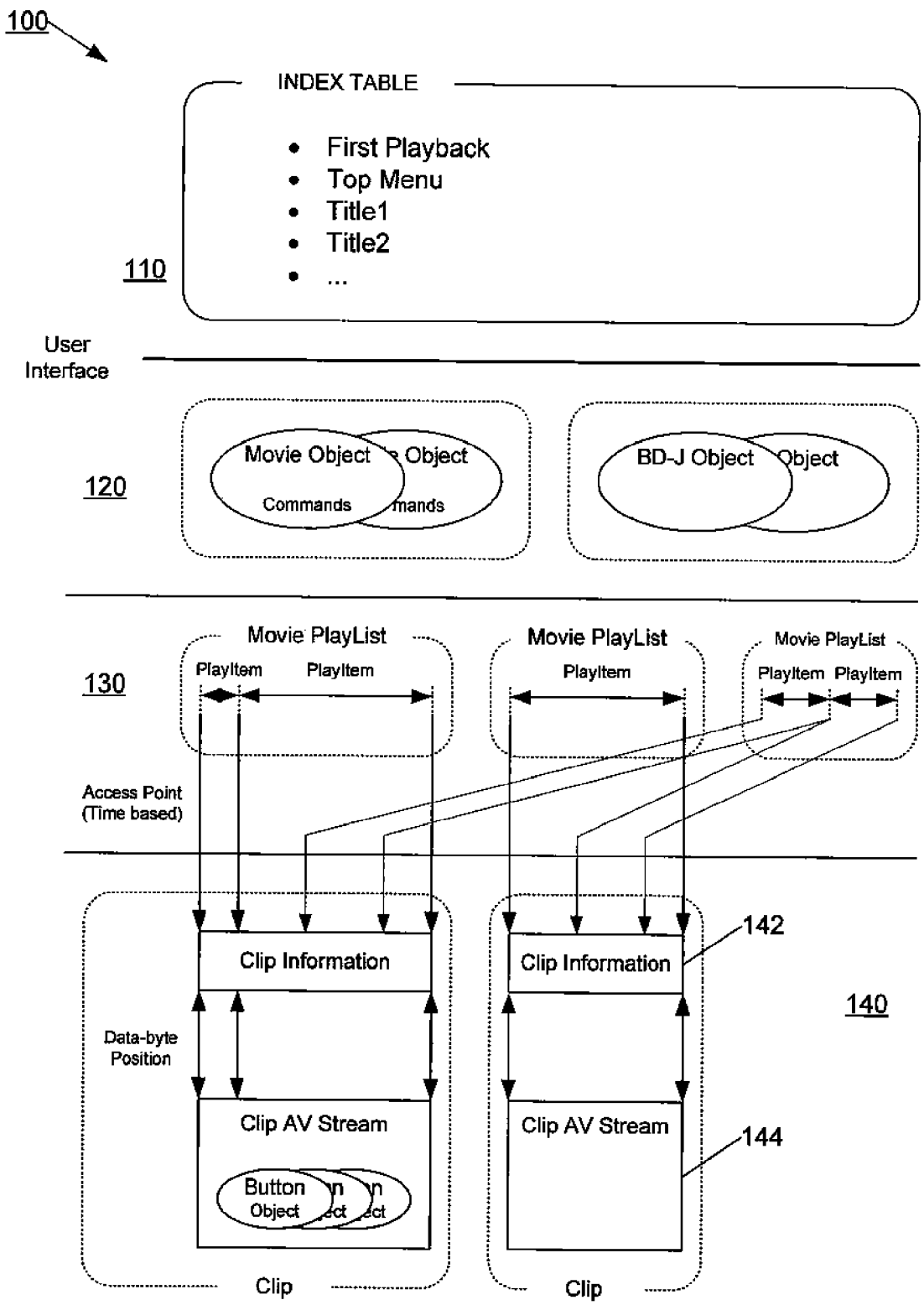
FIG. 1 provides a simplified overview of the BD-ROM data structure.

FIG. 1 provides a simplified overview of the BD-ROM data structure 100. BD-ROM has four layers for managing Audio/Video (AV) stream files as follows: Index Table 110, Movie Object/BD-J Object 120, Playlist 130, and Clip 140.

Figure 2:
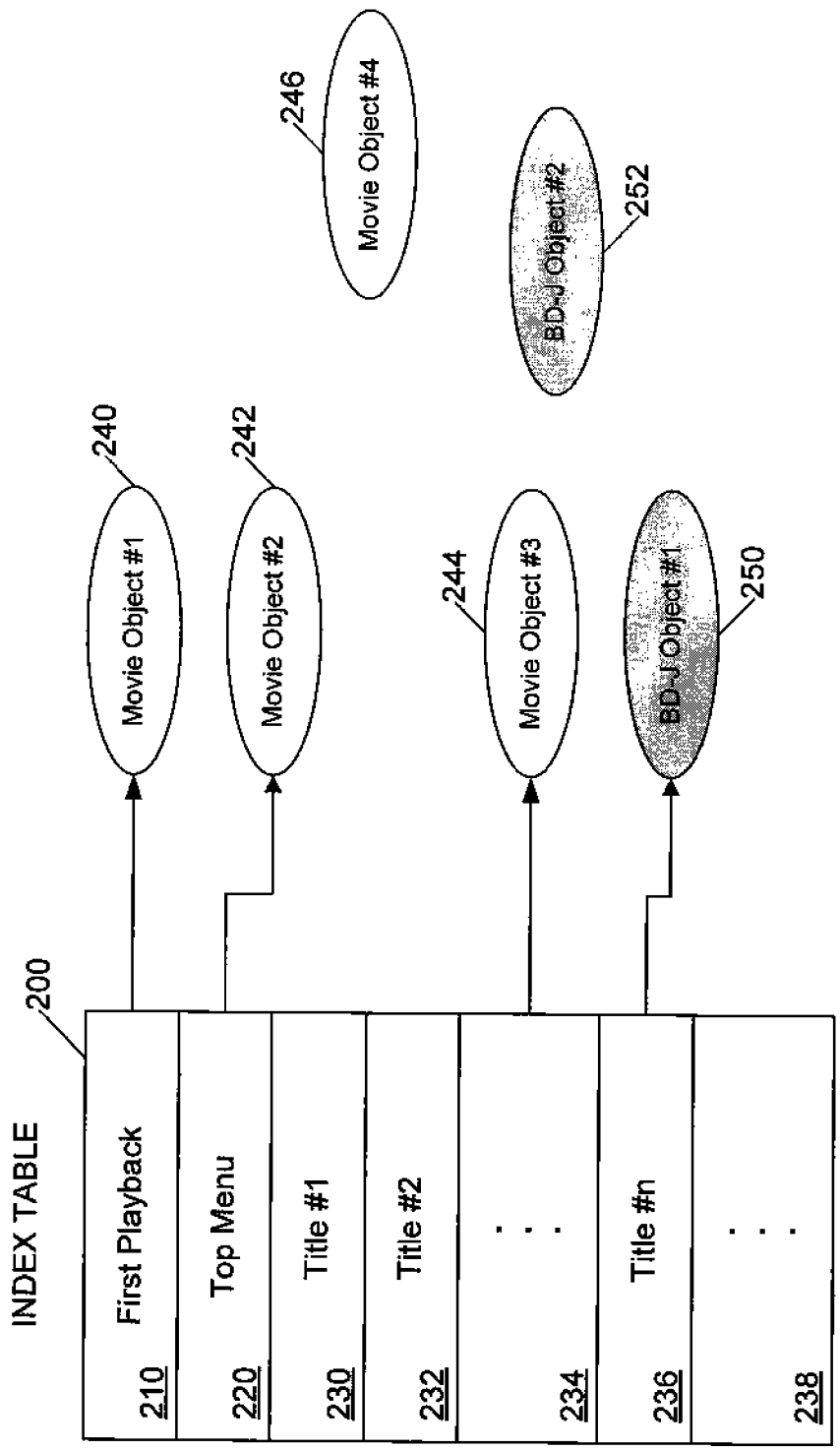
FIG. 2 shows Index Table, which is a top-level table structure that defines the Titles of a BD-ROM disc.

Index Table 200, shown in FIG. 2, is a top-level table structure that defines the Titles of a BD-ROM disc. A Title corresponds to any entry in the Index Table including First Playback 210, Top Menu 220, and Titles 230, 232, 234, 236, 238. First Playback 210 is used by content providers to perform automatic playback. Each Index Table entry links to either a Movie Object 240, 242, 244, 246 or BD-J Object 250, 252. The disc player references this table whenever a title is to be executed (e.g. whenever the Title Search or Menu Call operation is called).

Figure 3:
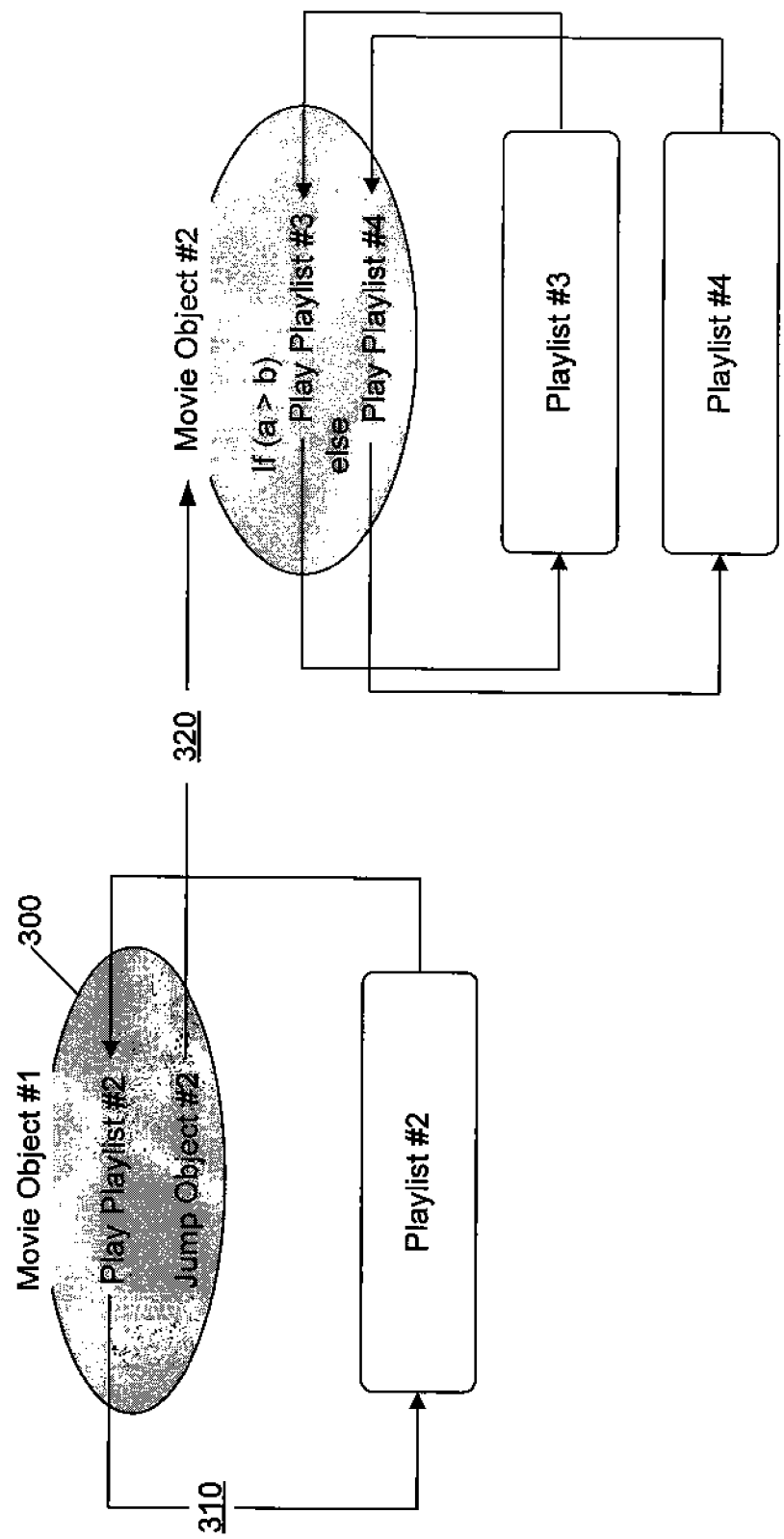
FIG. 3 shows one example of a Movie Object including navigation commands that can launch Playlist or another Movie Object.

A Movie Object includes executable lines of codes or navigation commands, which enable dynamic scenario description. Thus, as shown in FIG. 3, navigation commands in a Movie Object (e.g., 300) can launch Playlist playback 310 or another Movie Object 320. This enables the content providers to define a set of Movie Objects for managing playback of Playlists in accordance with a user's interaction and preferences.

When a Title associated with a BD-J Object in the Index Table on disc is selected, the corresponding application is automatically launched and its lifecycle is bound to the Title. A BD-J application is a Java Xlet which is controlled by the BD-ROM player's Application Manager through its Xlet interface. The Xlet interface has four states as follows: loaded, paused, active and destroyed. Once a BD-J application is destroyed, any resources allocated to it, such as memory and AV control, is released.

Figure 4:
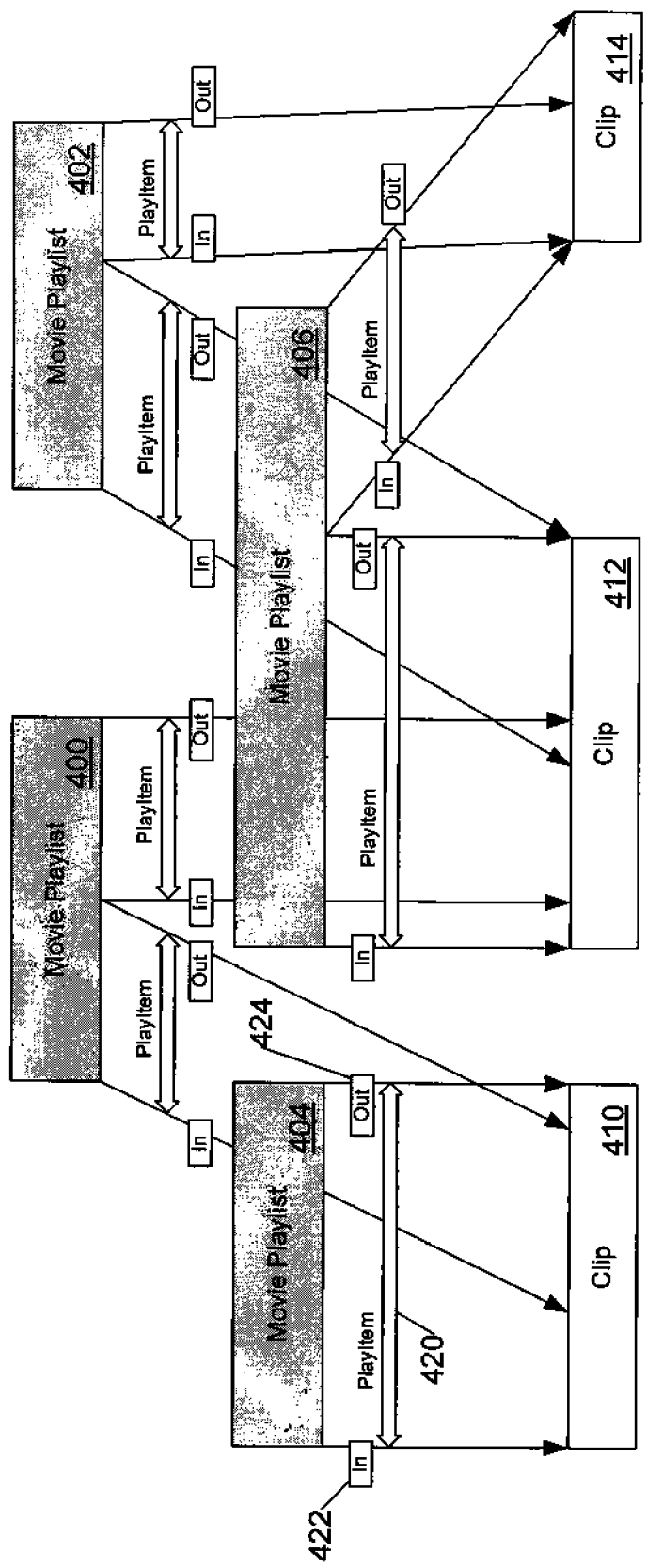
FIG. 4 shows one example of Playlists, which are a collection of playing intervals in the Clips that indicates which portion of the Clip to play and when to play the Clip.

Playlist (i.e., "Movie Playlist" in FIG. 4) 400, 402, 404, 406, illustrated in FIG. 4, is a collection of playing intervals in the Clips 410, 412, 414 that indicates which portion of the Clip to play and when to play the Clip. One such playing interval is called a PlayItem (e.g., 420) and includes an IN-point (e.g., 422) and an OUT-point (e.g., 424), each of which refers to positions on a time axis of the Clip. The IN-point indicates a start point of a playing interval, and the OUT-point indicates an end point of the playing interval.

Figure 5:
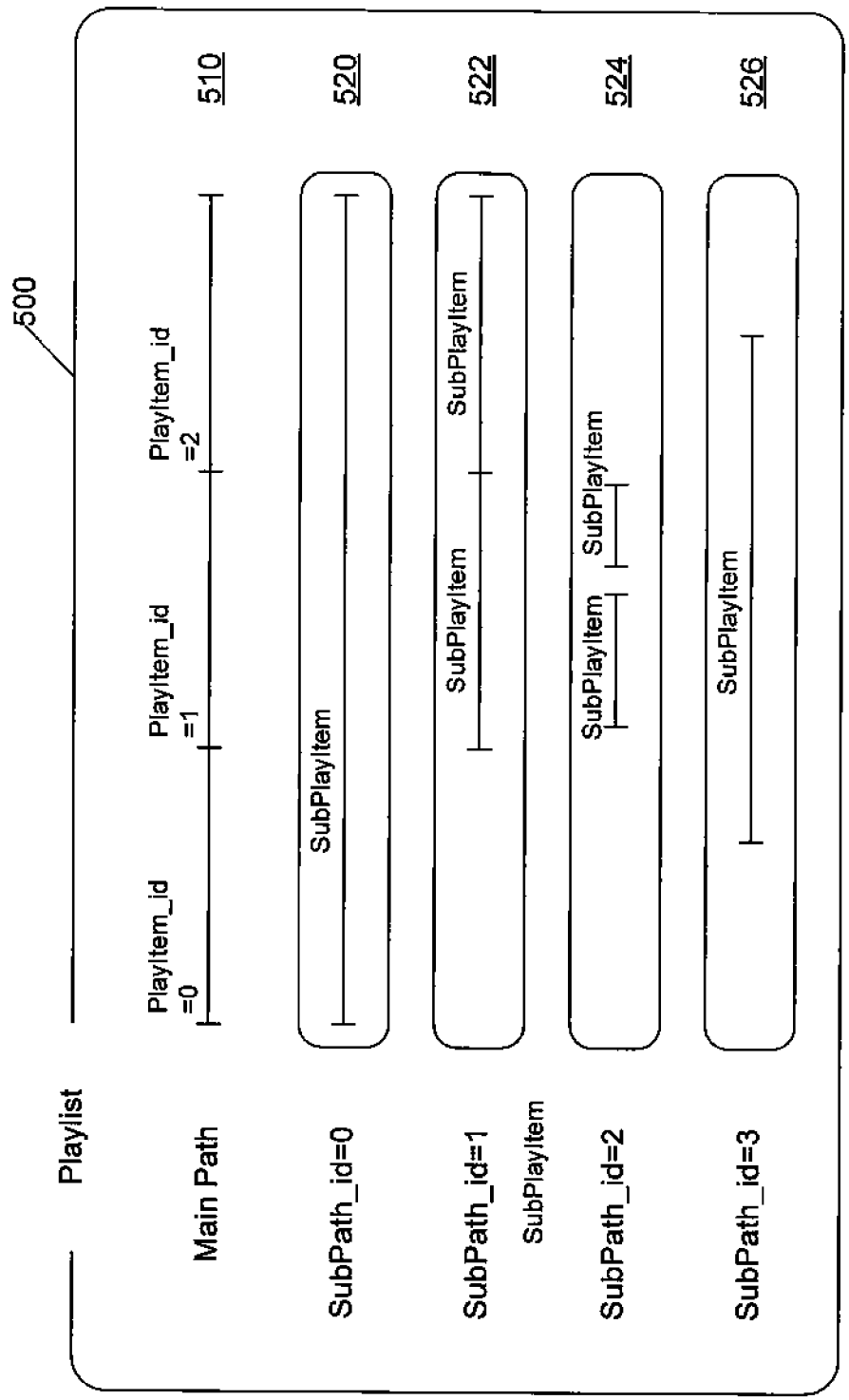
FIG. 5 shows an example of a Playlist including one main path that provides a master presentation of the Playlist and one or more sub-paths that provide auxiliary presentations associated with the master presentation.

As shown in FIG. 5, Playlist 500 has one main path 510 that provides a master presentation of the Playlist. The main path 510 may have one or more sub paths 520, 522, 524, 526 that provide auxiliary presentations associated with the master presentation. The main path 510 includes one or more Play-Items. The sub-path 520, 522, 524, 526 includes one or more SubPlayItems.

Figure 6:
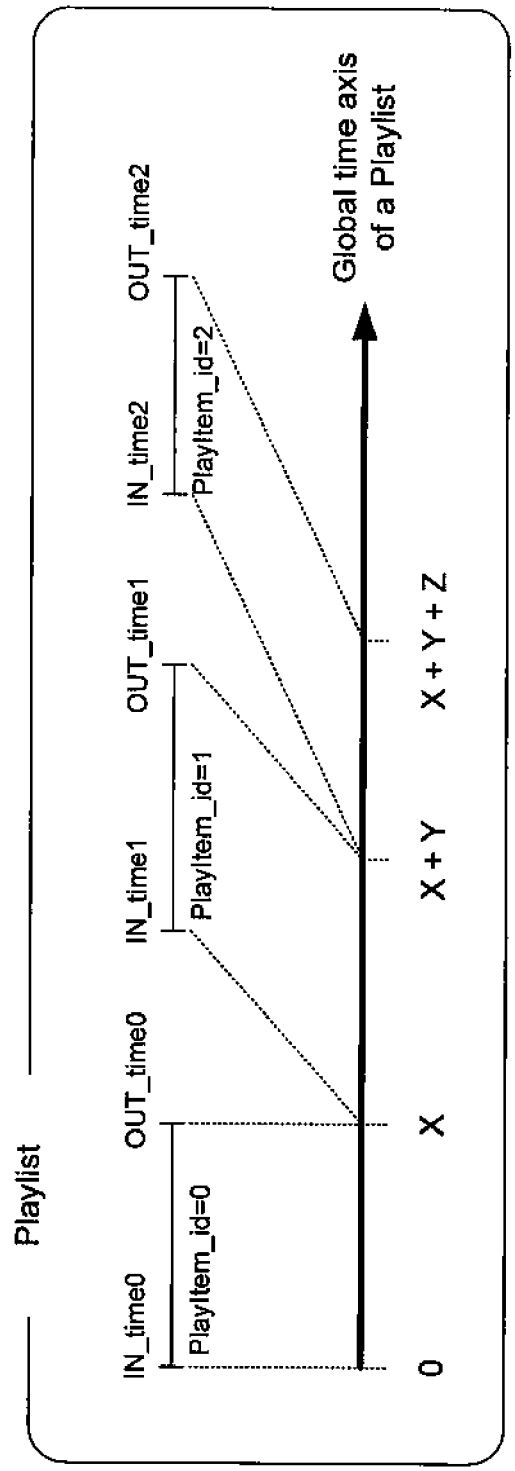
FIG. 6 shows one example of PlayItem specifying a time-based playing interval from the IN-time to the OUT-time.

FIG. 6 shows the PlayItem specifying a time-based playing interval from the IN-time until the OUT-time. The playing interval refers to a single Clip when the PlayItem does not have a multi-angle structure. The playing interval refers to more than one Clip when the PlayItem has a multi-angle structure.

Referring back to FIG. 1, an AV stream file together with its associated database attributes is considered to be one object. In the context of the BD-ROM data structure, the AV stream file is referred to as a Clip AV stream file 144, and the associated database attribute file is referred to as a Clip Information file 142. An object including the Clip AV stream file 144 and its corresponding Clip information file 142 is referred to as a Clip 140.

The Clip Information file 142 stores the time stamps of the access point into the corresponding AV stream file 144. The ED player reads the Clip Information file 142 to find out the position where it should begin to read the data from the Clip AV stream file 144. Therefore, there is a one-to-one relationship between a Clip AV stream file 144 and a Clip Information file 142.

All media are initially formed as "elementary streams", which is a way of denoting a file containing Dust one single type of AV data. For example, video is one elementary stream. If a BD contains two audio streams (e.g., each audio stream representing a particular language), each audio stream is an elementary stream. Each subtitle stream (referred to as 'Presentation Graphics' stream in the BD-ROM specification) is also a separate elementary stream. Therefore, the BD authoring system (BDAS) reads a number of elementary stream files and merges the files together to form data written onto a BD.

An access unit is a segment of an elementary stream (ES) that represents a small logical unit of data. Thus, an access unit is often used directly without reference to other parts of the elementary stream. For example, a single frame of video may be an access unit, or a section of an AC3 file representing a particular period of time, when decoded. Accordingly, access units are important primarily because they allow random access to any part of the AV stream (e.g., a user of a ED player can skip to any chapter and begin playback, or instruct the player to begin playback at a certain time into the movie).

However, access units can be very large (e.g., perhaps hundreds of kilobytes for a video frame). Thus, elementary streams must be further sub-divided (i.e., packetized) into small chunks, each of which fits into a single sector on the BD. The packetization process typically involves breaking up the elementary stream into a series of fixed-size chunks of bytes, where each of these chunks is known as a "packet" and will fit within a single sector on the disc. An elementary stream that has been divided into packets is known as a Packetized Elementary Stream (PES). For a structure compliance with the BD-ROM specification, the Clip AV stream file stores a PES referred to as an MPEG-2 Transport Stream (MPEG-2 TS).

Figure 7:
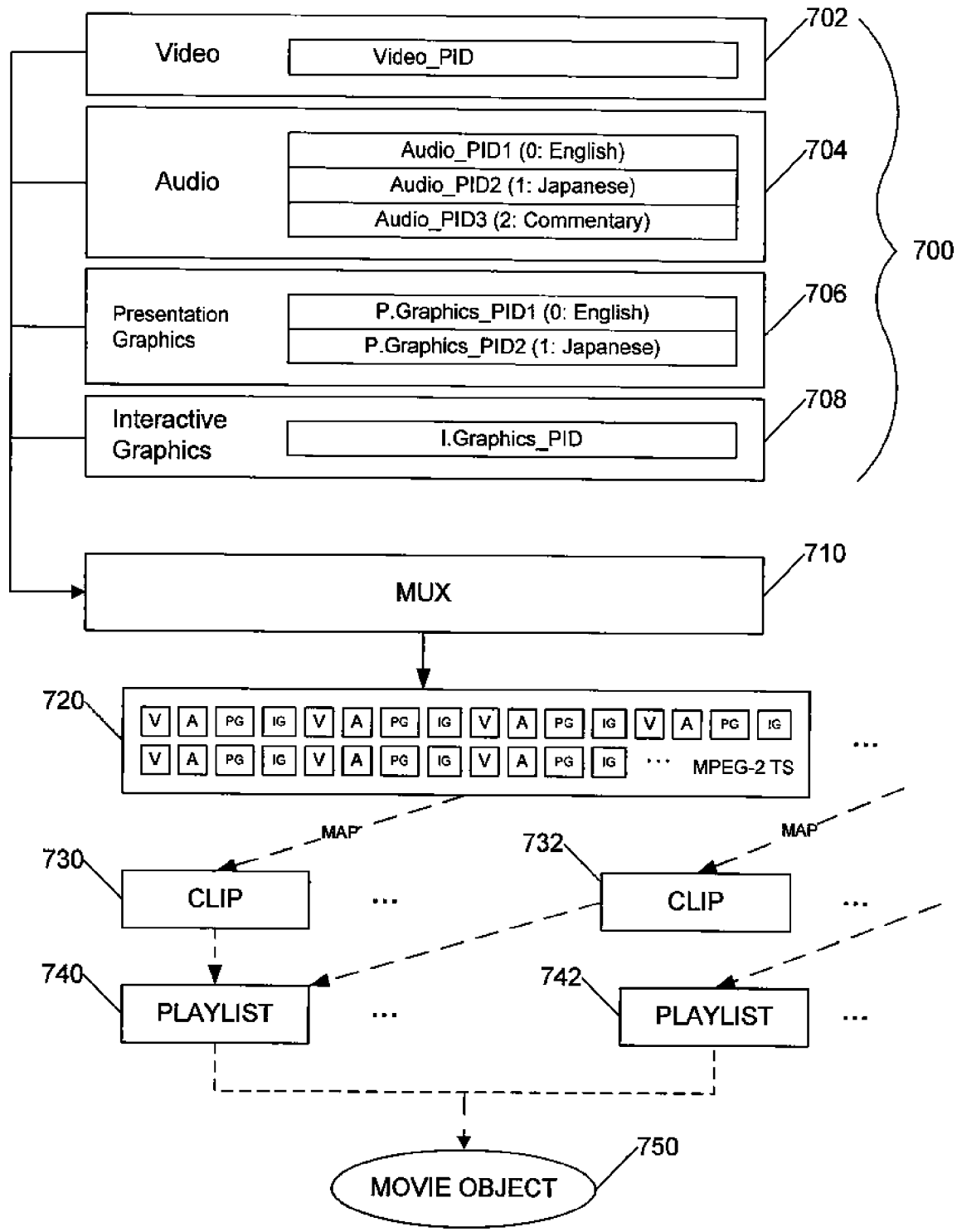
FIG. 7 shows an example process of merging elementary stream data into an MPEG-2 TS file and generating basic playable entities.

FIG. 7 shows an example process of merging elementary stream data 700 into an MPEG-2 TS file 720 and generating basic playable entities such as Playlist 740, 742, Clip 730, 732, and Movie Object 750. The playable entities can also include PlayItems.

In the illustrated implementation of FIG. 7, the elementary stream data 700 includes a video elementary stream 702, an audio elementary stream 704, a presentation graphics elementary stream 706, and an interactive graphics elementary stream 708. The elementary stream data are received and merged by a multiplexer 710 to generate a packetized stream file such as the MPEG-2 TS file 720. Playable Content, representing playable entities, is then generated. The playable entities include, among others, Playlists 740, 742, Clips 730, 732, and Movie Objects 750, and provide information describing the MPEG-2 TS file 720.

In one implementation, a Clip 730, 732 (similar to a Clip Information File 142 in FIG. 1) is generated by mapping the MPEG-2 TS file 720. For example, Clip 730 includes a description of the MPEG-2 TS file 720 including a description of: how many packets of video, audio, and other media data; what formats; how many channels; and other characteristics of the media data in the MPEG-2 TS file 720. Furthermore, as described above, each Playlist 740, 742 is generated as a collection of playing intervals in Clips, while the Movie Object 750 is generated with executable codes or commands that manage Playlists 740, 742.

Given the BD-ROM data structure as described above, a BDAS provides an environment to: receive the elementary stream data of different formats (e.g., video, audio, subtitle, etc.); assemble these data; define how the data will interact with each other (e.g., which data plays first, what happens when a particular button is pressed, etc.); and generate an output image to the user. The BDAS provides to the user a methodology to simplify the complex structures and their interlinking to make the authoring process easier.

The methodology includes abstractions that offer the functionality for a user to switch the view based on the requirements and level of expertise. This switching of the view either hides or exposes different levels of the underlying details of the data structures created by the user, directly or indirectly. At the top level, only a few of the high level structures are presented, whereas at the lowest level many simpler interconnected structures are exposed. This methodology also provides a mechanism to author projects independent of the underlying format to which the final project output needs to comply.

In one implementation, one such abstraction referred to as Playable Content is provided. This is an abstraction that allows PlayList and Clip data to be authored as a unified structure. This simplifies the authoring process considerably as most of the interconnections between the lower level data structures are already done. Additionally, the Playable Content also abstracts the complexity in creating the underlying Movie Object and Index Table entries if they exist. Other abstract structures that the BDAS exposes are Virtual Playable Content, Titles, Page Layer Compositions and Page Layers. Playable Content (and other structures listed above) can be seen in varying levels of detail so that a user can customize the data seen on the screen to match his or her requirements and level of expertise.

Figure 8A:
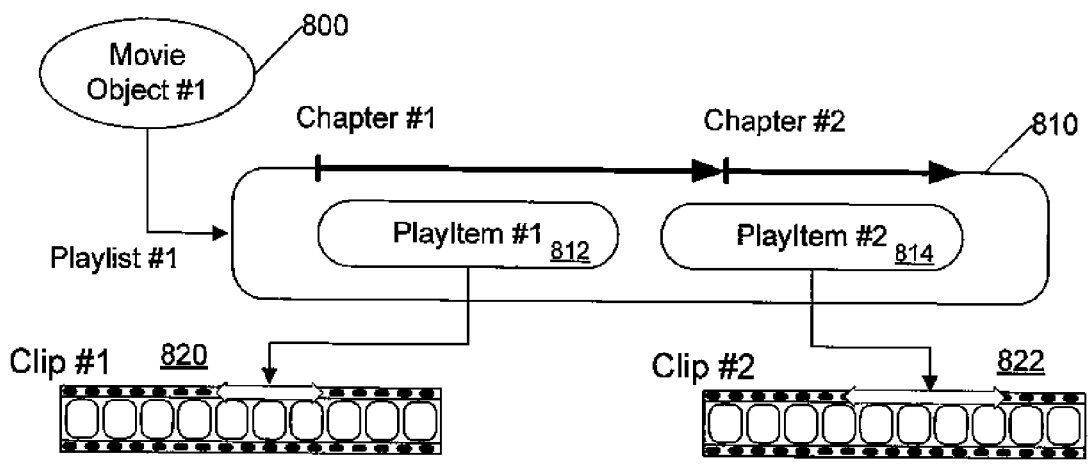
FIG. 8A shows playable content representing a Movie Object, a Playlist, PlayItems, and Clips.
Figure 8B:
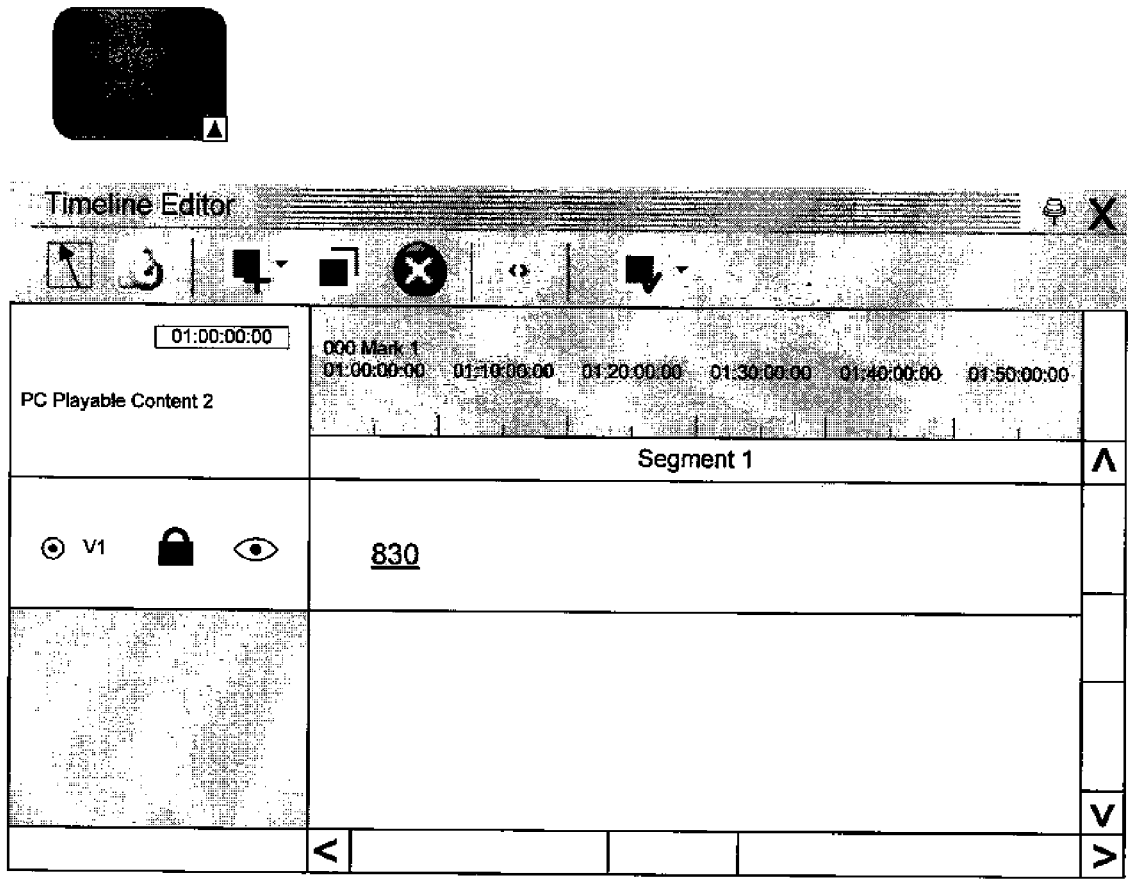
FIG. 8B shows playable content including a video stream by default.

As discussed above, Playable Content is an abstraction that represents the basic playable entity such as Playlist, Clip, and Movie Object, and includes the data structure necessary for playback on a BD player. For example, as shown in FIG. 8A, Playable Content represents a Movie Object 800, a Playlist 810, PlayItems 812, 814, and Clips 820, 822. Further, as shown in FIG. 8B, Playable Content includes a video stream 830 by default.

Figure 9A:
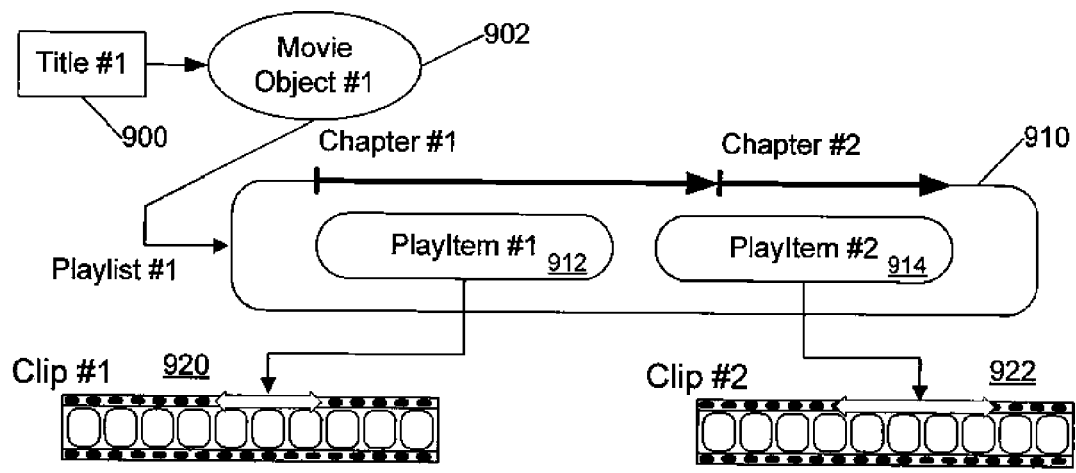
FIG. 9A shows playable content representing a Title that references a Movie Object, a Playlist, PlayItems, and Clips.

When Playable Content is assigned an entry in the Index Table, it becomes a Title. As shown in FIG. 9A, a Title is generated directly using a Title object 900. Again, Playable Content also represents a Movie Object 902, a Playlist 910, PlayItems 912, 914, and Clips 920, 922. Further, as shown in FIG. 9B, a Title includes a video stream 940 and an audio stream 950 by default.

Figure 9B:
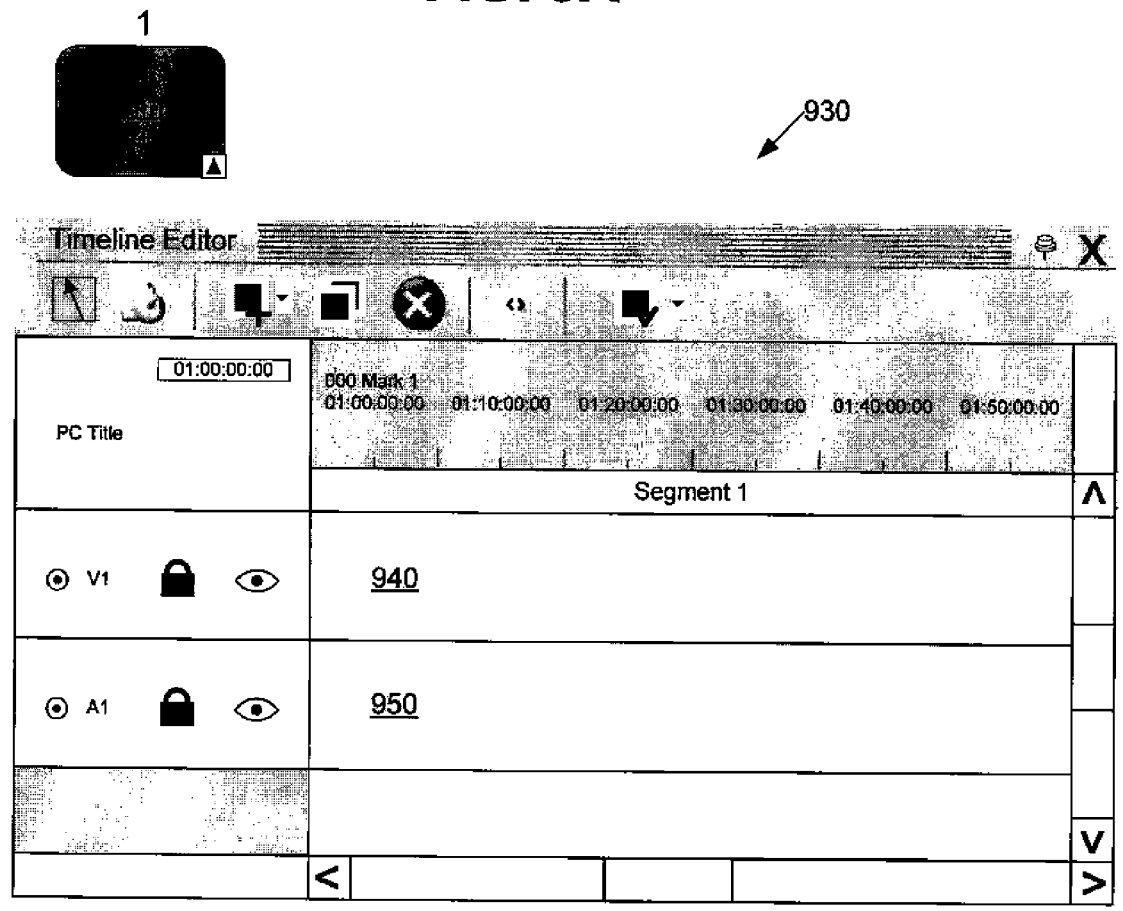
FIG. 9B shows playable content including a video stream and an audio stream by default.

In the illustrated implementation of FIG. 9B, a user can drag and drop the elementary stream files of media data (e.g., the video data in video stream 940 and the audio data in audio stream 950) into the Playable Content structure of the BDAS 930, and instruct it to multiplex the streams of media data. In response, the Playable Content structure of the BDAS 930 multiplexes the elementary files of media data, and automatically generates the basic playable entities 902, 910, 912, 914, 920, 922 needed for authoring a BD. Thus, the user can then adjust items such as timeline in the Playable Content structure of the BDAS 930 to adjust the parameters of the generated playable entities 902, 910, 912, 914, 920, 922.

For example, in one implementation, when the elementary files of media data are received, the Playable Content structure of the BDAS 930 determines the characteristics of the media data such as length and format. Then, when the multiplex instruction is received, the Playable Content structure 930 generates an MPEG-2 TS file and a corresponding Clip (e.g., 920 or 922). The Playable Content structure 930 also generates PlayItems (e.g., 912 or 914), a Playlist (e.g., 910), and a Movie Object (e.g., 902).

Figure 10:
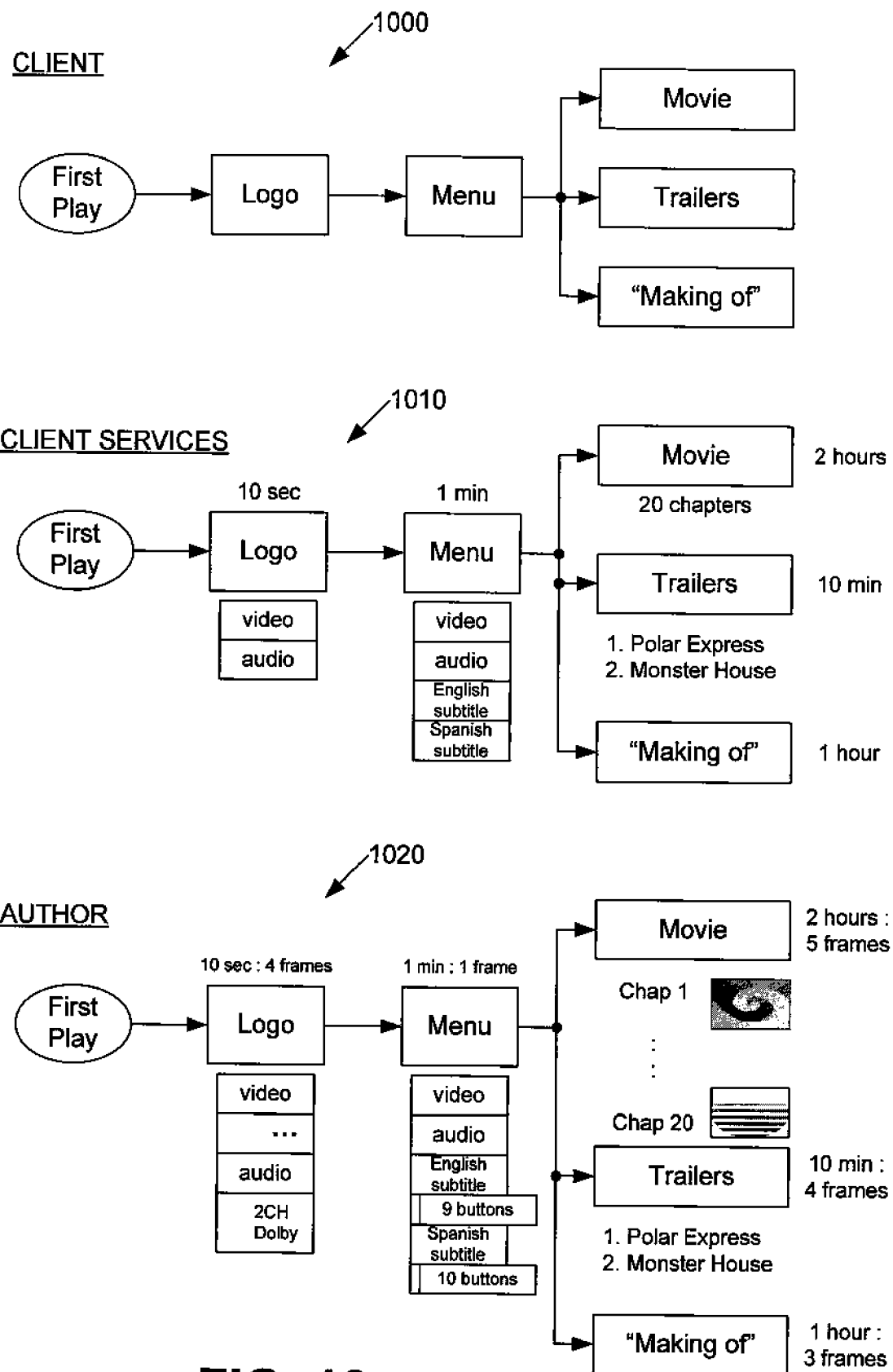
FIG. 10 shows one example of a BDAS providing varying levels of details of Playable Content for varying levels of users.

In another implementation, illustrated in FIG. 10, the BDAS provides varying levels of details of Playable Contents for varying levels of users (e.g., a client 1000, client services 1010, and an author 1020). For example, for the client 1000, the BDAS defines a sequence in which a BD player plays a "First Play" object, a "Logo", and a "Menu" displaying three items: "Movie", "Trailers", and "Making of" (the Movie). This set of Playable Contents is then sent to the client services 1010, which provides further details such as the length of each item and the specification of sub-items within each item. For example, the Logo is defined as being 10 seconds long and including video and audio; the Menu is defined as being one minute long and including video, audio, and English and Spanish subtitles; and the Movie menu item is defined as being two hours long and including 20 chapters. Other items and sub-items can be defined by the client services 1010. Next, the author 1020 defines further details. For example, the Logo is defined as a two-channel Dolby audio with the exact length of ten seconds and four frames; the Menu is defined with English subtitle using nine buttons and the exact length being one minute and 1 frame; chapters in the Movie menu item are listed with thumbnails and timecodes; and so on.

As mentioned above, another abstract structure that the BDAS exposes is Virtual Playable Content, which allows reuse of Clips belonging to other Playable Contents. For example, if there are three 'Deleted Scenes' in a project that are Playable Contents configured to be played individually, then Virtual Playable Content can be used to generate a Playlist of the three 'Deleted Scenes' to play all three scenes in a 'Play All' scenario. In another example of Virtual Playable Content, if a part of a large Playable Content needs to be played independently, then that part can be put into Virtual Playable Content that includes a trimmed version of the Playable Content.

Figure 11:
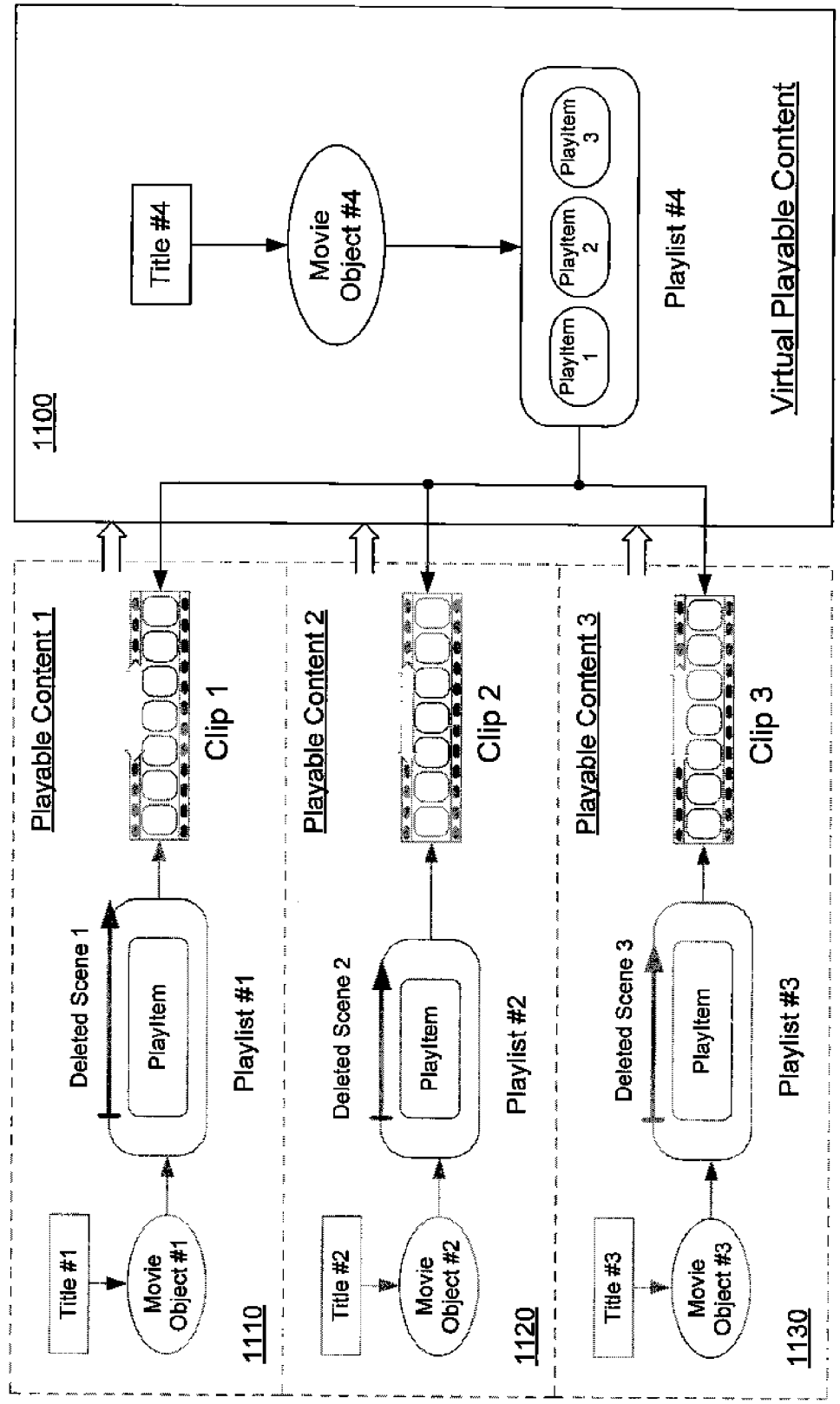
FIG. 11 shows one example of virtual playable content generated using multiple playable contents.

Referring to FIG. 11, assuming Clip 1 through Clip 3 represent the three 'Deleted Scenes', Playlist #1 in Playable Content 1110 includes a PlayItem that plays Clip 1, Playlist #2 in Playable Content 1120 includes a PlayItem that plays Clip 2, and Playlist #3 in Playable Content 1130 includes a PlayItem that plays Clip 3. If all three deleted scenes are to be played in a 'Play All' scenario, then Virtual Playable Content 1100 can be generated with Playlist #4 configured to play all three scenes: Clip 1, Clip 2, and Clip 3. These 3 Clips are mapped to using 3 PlayItems in the Virtual Playable Content. Thus, the Playable Content structure of the BDAS generates Virtual Playable Content 1100 by assembling basic playable entities of Playable Contents 1110, 1120, 1130.

Figure 12:
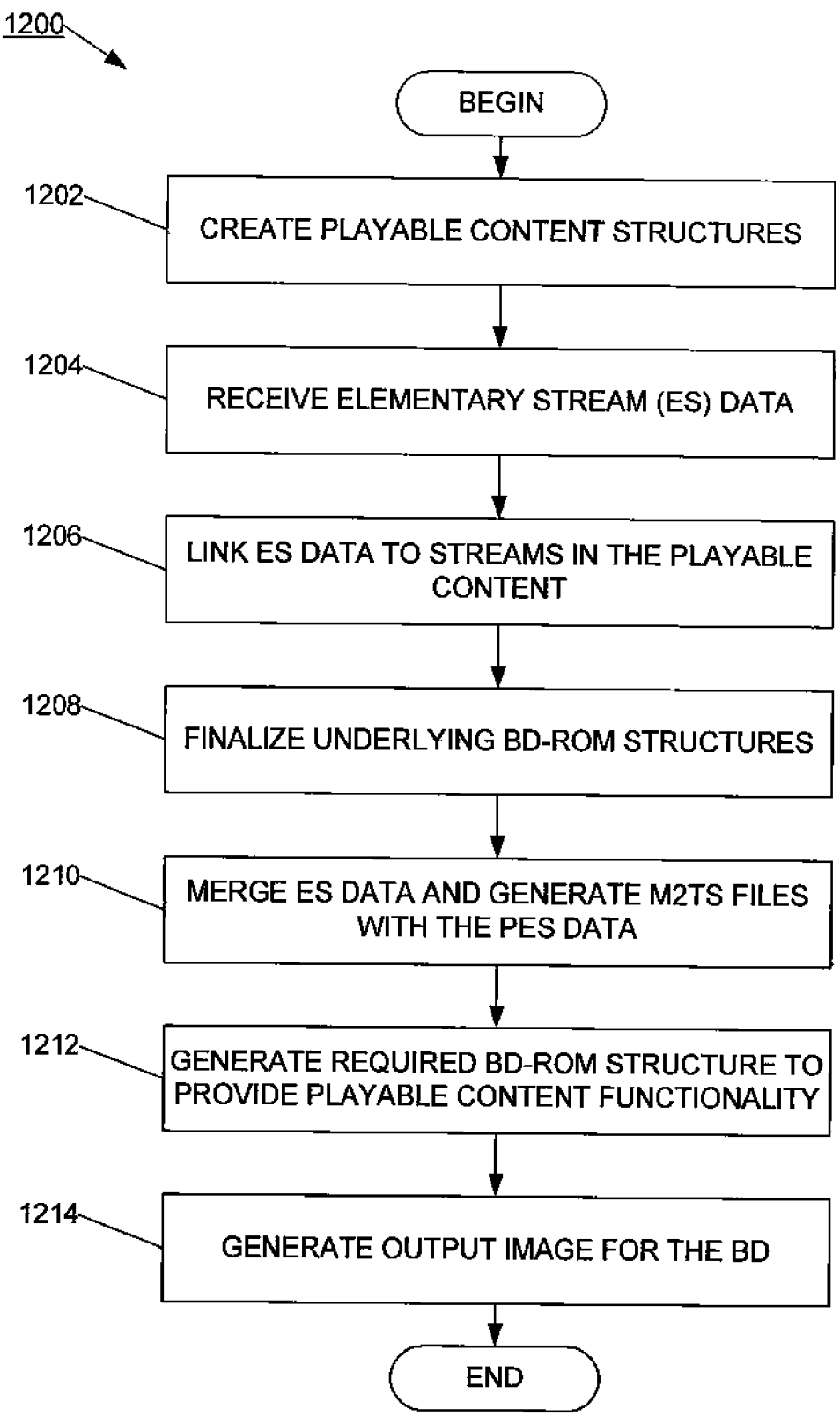
FIG. 12 is a flowchart illustrating a method for authoring a Blu-ray Disc.

FIG. 12 is a flowchart 1200 illustrating a method for authoring a Blu-ray Disc. The BD authoring method provides to the user a methodology to simplify the complex structures and their interlinking to make the authoring process easier. For example, in the illustrated implementation of FIG. 12, playable content structures are created, at box 1202. At box 1204, the elementary stream (ES) data are received, and linked to streams in the playable content, at box 1206. The underlying BD-ROM structures are finalized, at 1208. At 1210, the ES data are merged and METS files are generated with the PES data. The required BD-ROM structures are generated, at box 1212, to provide Playable Content functionality. Finally, the Output Image is generated, at 1214, for the BD.

Figure 13:
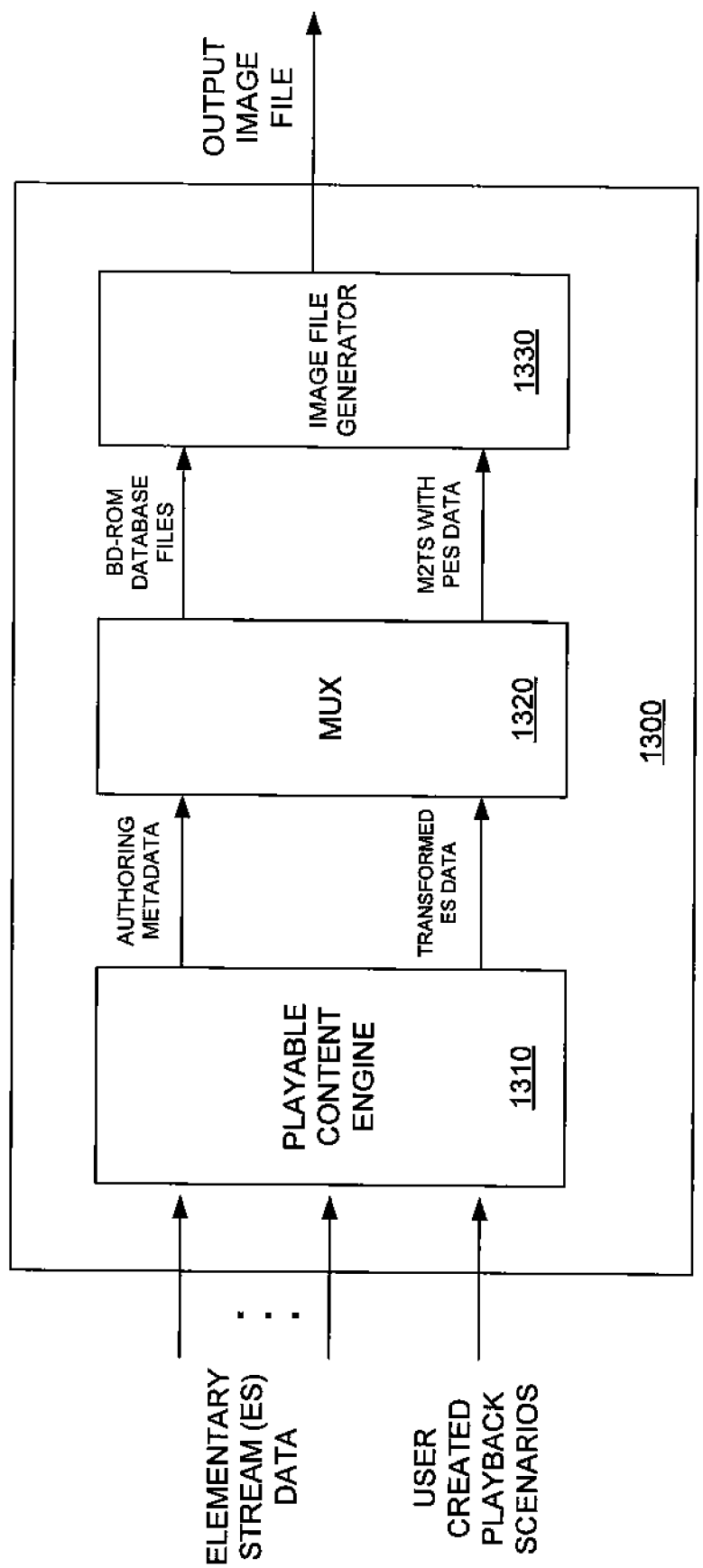
FIG. 13 is a block diagram of a Playable Content structure of the BDAS.

|FIG. 13| is a block diagram of a Playable Content generation engine of the BDAS 1300. In the illustrated implementation of FIG. 13, the Playable Content structure of the BDAS 1300 includes a Playable Content engine 1310, a multiplexer 1320, and an Image File generator 1330. The Playable Content Engine 1310 receives input from the user regarding how the playable entities are to be constructed (at varying levels of detail). It also receives the Elementary Stream data from where it can extract metadata for the required BD-ROM structures. The Playable Content Engine 1310 feeds the multiplexer 1320 which receives commands and merges elementary stream data to generate MPEG-2 TS files that contain the packetized elementary stream data. The multiplexer 1320 also creates the other files required by the BD-ROM specification such as the Index Table File, Movie Object File, Playlist Files, CLPI Files. In the case of BDJ content, other files will also be created that enable the Java enhanced interactivity content. The Image File generator 1330 receives the files output by the multiplexer 1320 and generates the image file that is representative of the playable entities that the user had authored as Playable Contents. As described above, the playable entities include, among others, Playlists, Clips, and movie Objects, and provide information describing the packetized stream.

Figure 14A:
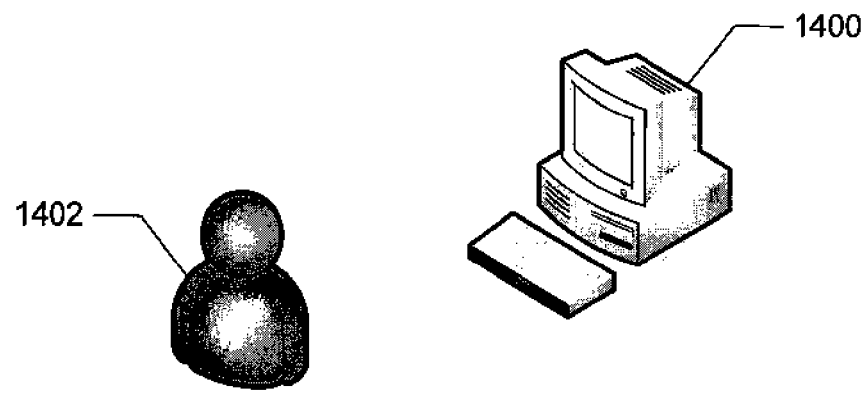
FIG. 14A shows a representation of a computer system and a user.

FIG. 14A shows a representation of a computer system 1400 and a user 1402. The user 1402 can use the computer system 1400 to author a Blu-ray disc. The computer system 1400 stores and executes a Playable Content generator of the BDAS 1412, which receives elementary stream data as an input and outputs Playable Content. In one example, Playable Content represents playable entities including, among others, Playlists, Clips, and Movie Objects.

Figure 14B:
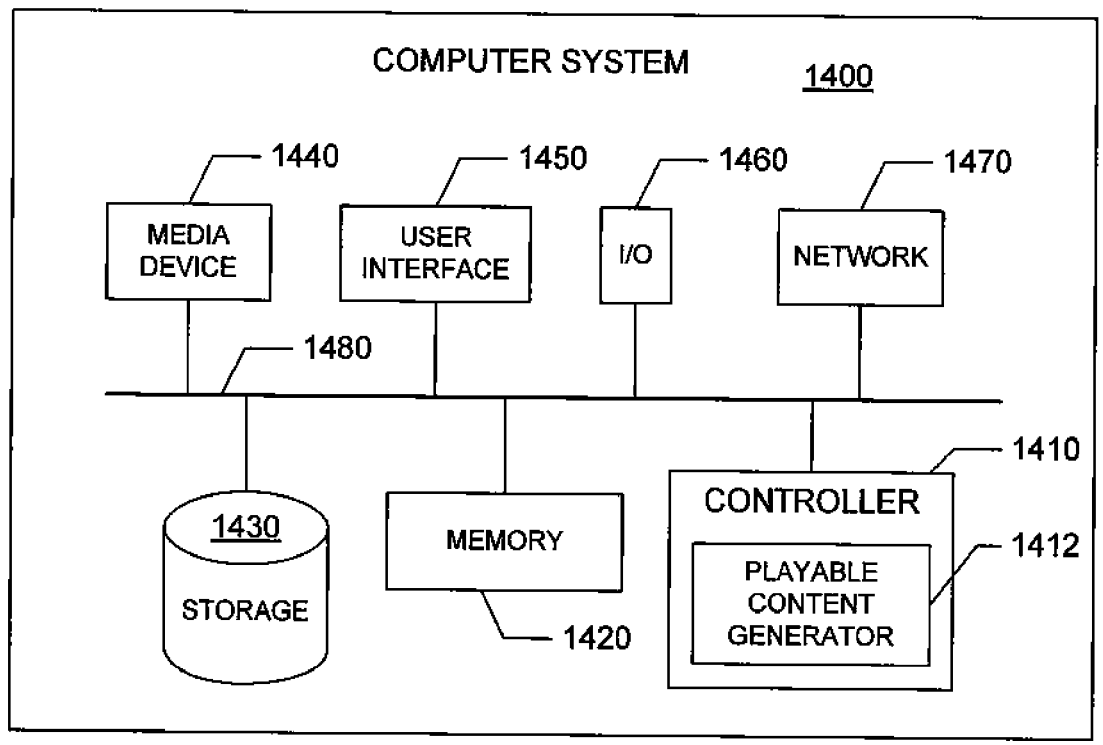
FIG. 14B shows a block diagram of one implementation of the computer system in FIG. 14A, including the Playable Content generator of the BDAS.

FIG. 14B shows a block diagram of one implementation of the computer system 1400 in FIG. 14A, including the Playable Content generator of the BDAS 1412. The computer system 1400 includes a controller 1410, a memory 1420, storage 1430, a media device 1440, a user interface 1450, an input/output (I/O) interface 1460, and a network interface 1470. These components are interconnected by a common bus 1480. Alternatively, different connection configurations can be used, such as a star pattern with the controller at the center.

The controller 1410 is a programmable processor and controls the operation of the computer system 1400 and its components. The controller 1410 loads instructions from the memory 1420 or an embedded controller memory (not shown) and executes these instructions to control the system. In its execution, the controller 1410 provides the Playable Content generator of the BDAS 1412 as a software system. Alternatively, this service can be implemented as separate components in the controller 1410 or the computer system 1400.

Memory 1420 stores data temporarily for use by the other components of the computer system 1400. In one implementation, memory 1420 is implemented as RAM. In one implementation, memory 142G also includes long-term or permanent memory, such as flash memory and/or ROM.

Storage 1430 stores data temporarily or long term for use by other components of the computer system 1400, such as for storing BD data used by the Playable Content generator of the BDAS 1412. In one implementation, storage 1430 is a hard disk drive.

The media device 1440 receives removable media and reads and/or writes data to the inserted media. In one implementation, the media device 1440 is an optical disc drive.

The user interface 1450 includes components for accepting user input from the user of the computer system 1400 and presenting information to the user. In one implementation, the user interface 1450 includes a keyboard, a mouse, audio speakers, and a display. The controller 1410 uses input from the user to adjust the operation of the computer system 1400.

The I/O interface 1460 includes one or more I/O ports to connect to corresponding I/O devices, such as external storage or supplemental devices (e.g., a printer or a PDA). In one implementation, the ports of the I/O interface 1460 include ports such as: USB ports, PCMCIA ports, serial ports, and/or parallel ports. In another implementation, the I/O interface 1460 includes a wireless interface for communication with external devices wirelessly.

The network interface 1470 includes a wired and/or wireless network connection, such as an RJ-45 or "Wi-Fi" interface (802.11) supporting an Ethernet connection.

The computer system 1400 includes additional hardware and software typical of computer systems (e.g., power, cooling, operating system), though these components are not specifically shown in FIG. 14B for simplicity. In other implementations, different configurations of the computer system can be used (e.g., different bus or storage configurations or a multi-processor configuration).

Various illustrative embodiments of the present invention have been described. However, one of ordinary skill in the art will recognize that additional embodiments are also possible and within the scope of the present invention. For example, although the disc authoring system has been described exclusively in terms of the BD format, the system can be used to author discs in formats other than the BD format, such as the DVD format and the HD-DVD format.

Accordingly, the present invention is not limited to only those embodiments described above.

What is claimed is:

1. A method comprising:
   authoring media data on a Blu-ray disc (BD) using playable content structure comprising:
   receiving and multiplexing elementary stream of the media data into packetized elementary streams;
   generating playable entities of the BD including playlists, clips, movie objects, and playitems;
   adjusting parameters of the playable entities including a timeline in the playable content structure to packetize the media data into manageable chunks;
   generating output image for the BD representing playable content structure using the adjusted playable entities of the BD including the timeline in the playable content structure to provide accurate timing information describing the packetized elementary streams and to provide information regarding navigation scenarios of the BD; and
   generating virtual playable content representing multiple playable contents by enabling reuse of the playable entities in the playable content structure.

2. The method of claim 1, wherein said elementary stream of media data includes:
   a video elementary stream;
   an audio elementary stream;
   a presentation graphics elementary stream;
   an interactive graphics elementary stream; and
   a text subtitle stream.

3. The method of claim 2, wherein merging said elementary stream of media data includes:
   multiplexing said video elementary stream, said audio elementary stream, said presentation graphics elementary stream, said interactive graphics elementary stream, and said text subtitle stream into packetized elementary stream of media data.

4. The method of claim 3, wherein said packetized elementary stream of media data is packaged in an MPEG-2 transport stream file.

5. The method of claim 1, further comprising
   generating virtual playable content representing a subset of said playable entities.

6. A Blu-ray disc (BD) authoring method comprising:
generating playable entities of a BD;
adjusting parameters of the playable entities including a timeline in the playable content structure to packetize the media data into manageable chunks,
wherein the playable content structure is configured to provide varying levels of details for varying levels of users;
receiving and merging elementary stream of media data into packetized stream data;
generating output image for the BD representing the playable content structure using the adjusted playable entities of the BD including a timeline in the playable content structure to provide accurate timing information describing said packetized stream data and to provide information regarding navigation scenarios of the BD; and
generating virtual playable content representing multiple playable contents by enabling reuse of playable entities in the playable content structure.

7. The method of claim 6, wherein said varying levels of users include a client, client services, and an author.

8. The method of claim 7, wherein said playable content structure includes more levels of details for said client services than said client.

9. The method of claim 7, wherein said playable content structure includes more levels of details for said author than said client services.

10. The method of claim 7, wherein generating output image for the BD includes specifying a sequence in which a BD player plays items in said packetized stream data.

11. The method of claim 10, wherein said items in said packetized stream data include
a first play object;
a logo; and
a menu.

12. A Blu-ray disc authoring system, comprising:
a playable content engine configured to generate output image for the BD representing playable contents using packetized elementary stream data,
wherein the packetized elementary stream data is formed by merging elementary stream of media data, and
wherein the elementary stream of media data is received and linked to a playable content structure, and
wherein the playable content structure is used to adjust parameters of playable entities; and
a multiplexer configured to:
receive and multiplex the elementary stream of media data into the packetized elementary stream data;
generate playable entities of the BD;
adjust parameters of the playable entities including a timeline in the playable content structure to packetize the media data into manageable chunks; and
generate output image for the BD representing the playable content structure using the adjusted playable entities of the BD including a timeline in the playable content structure to provide accurate timing information describing said packetized stream data and to provide information regarding navigation scenarios of the BD; and
a virtual playable content generator configured to generate virtual playable content representing multiple playable contents by enabling reuse of the playable entities in the playable contents.

13. The system of claim 12, wherein said packetized elementary stream data is packaged in one or more MPEG-2 transport stream files.

14. The system of claim 12, wherein said playable entities of the BD comprise
a playlist, one or more playitems, one or more clips, and a movie object or a portion of a movie object.

15. The system of claim 14, wherein said one or more clips provides mapping of said packetized elementary stream data including a number of packets of each elementary stream in said packetized elementary stream data.

16. The system of claim 14, wherein said one or more clips provides mapping of said packetized elementary stream data including the format of each elementary stream in said packetized elementary stream data.

17. The system of claim 14, wherein said one or more clips provides mapping of said packetized elementary stream data including a number of channels of each elementary stream in said packetized elementary stream data.

18. The system of claim 12, further comprising
a virtual playable content generator configured to generate virtual playable content representing subsets of one or more playable contents by enabling reuse of the playable entities in said playable contents.

19. A non-transitory storage medium for storing a computer program for authoring media data on a Blu-ray Disc (BD) using playable content structure, the computer program comprising executable instructions that cause a computer to:
receive and multiplex elementary stream of the media data into packetized elementary streams;
generate playable entities of the BD including playlists, clips, movie objects, and playitems;
adjust parameters of the playable entities including a timeline in the playable content structure to packetize the media data into manageable chunks; and
generate output image for the BD representing the playable content structure using the adjusted playable entities of the BD including a timeline in the playable content structure to provide accurate timing information describing the packetized elementary streams and to provide information regarding navigation scenarios of the BD; and
generate virtual playable content representing multiple playable contents by enabling reuse of the playable entities in the playable content structure.

* * * * *